United States Patent Office 3,110,732
Patented Nov. 12, 1963

3,110,732
METHOD FOR PREPARING BASIC POLYETHER COMPOSITIONS
George P. Speranza, Austin, and Sherman D. Lesesne, Georgetown, Tex., assignors to Jefferson Chemical Company, Inc., Houston, Tex., a corporation of Delaware
No Drawing. Filed Dec. 18, 1959, Ser. No. 860,317
8 Claims. (Cl. 260—584)

The present invention relates to a method for preparing basic polyether compositions. The compositions in question may also be described as primary amine derivatives of polyalkylene glycols. The higher basic polyether compositions prepared by this process are novel compositions and are the subject of an application Serial No. 860,356 entitled "Basic Polyether Compositions," filed December 18, 1959, in the name of George P. Speranza and assigned to a common assignee.

Polyether glycols, also known as polyoxyalkylene glycols, comprise a very large class of polymeric materials having molecular weights ranging up to 100,000 and above. These materials have a broad range of valuable applications as lubricants, vehicles, solvents, binders and as chemical intermediates in the rubber, food, pharmaceutical, cosmetic, agricultural, textile, paper, petroleum and other industries. The many valuable applications of the polyether glycols suggest that derivatives of these materials, having modified physical and chemical properties, would also have a variety of valuable applications. Despite the extensive commercial development of the polyether glycols, however, basic counterparts or derivatives of these materials have not been available or known heretofore.

A method has now been discovered for preparing primary amine derivatives of polyalkylene glycols, these materials being more briefly referred to as basic polyether compositions. The compositions produced by this method may be represented by the following formula:

$$Z-(A)_n-(B)_{n'}-(C)_{n''}-H$$

in which Z represents the radical $NH_2-$, or $NH_2-R'-$ in which R' is a methylene or a dimethylene radical, A, B, and C represent an oxyalkylene group having the formula

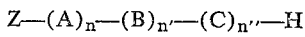

in which R is hydrogen or a lower alkyl radical having 1 to 2 carbon atoms, A being different from B and B different from C, $n$ is a number from 1 to 200, $n'$ is 0, or 1 to 200 and $n''$ is 0 or 1 to 200, the sum of $n$, $n'$ and $n''$ having a value of 2 to about 200. The molecular weights of these compositions will range from about 100 up to about 10,000 or above.

The basic polyether compositions prepared by this process are useful for preparing non-ionic and cationic emulsifiers and have uses in the insecticide, wax, leather and buffing industries. They are valuable as foam-stabilizers in low-foaming soaps, as antistatic agents in plastics, as re-wetting agents for textiles and as corrosion inhibitors in the petroleum industry. They are also useful as co-emulsifiers in surfactant blends and in materials that are acid sensitive. The water-insoluble primary basic polyethers are valuable in ore flotation processes.

The compositions of this invention are prepared in a three step process employing an alkanolamine having a primary amine group as the starting material. The alkanolamine reactant is contacted with a carbonyl compound to effect the formation of a condensation product and this condensation product, thereafter contacted with an alkylene oxide to effect the formation of an alkylene oxide adduct of the condensation product. The so-formed adduct is ultimately hydrolyzed to produce the desired basic polyether composition.

The condensation of an alkanolamine with a carbonyl compound is a well known reaction in which a primary amine and a carbonyl compound combine or condense at the amino and carbonyl groups respectively with the exclusion of a mol of water. The condensation product may be a Schiff base or an oxazolidine or in some cases may be a mixture of both types of products. The purpose of this step in the instant process is to effectively block the amino group so that this group will not be reactive during the oxyalkylation step.

Alkanolamines which may be employed as starting reactants in the instant process for the preparation of basic polyether compositions are represented by the formula:

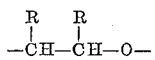

in which Z represents the radical $NH_2-$ or $NH_2-R'-$, R' is a methylene or a dimethylene radical, R represents hydrogen or a lower alkyl group having 1 to 2 carbon atoms, and $x$ represents an integer from 1 to 2. Specific alkanolamines which may be employed include monoethanolamine, 1-amino-2-propanol, 2-amino-1-propanol, 3-amino-1-propanol, 2-(2-aminoethoxy)ethanol, 1-amino-2-butanol, 2-amino-3-butanol and the like.

Carbonyl compounds including both aldehydes and ketones may be employed to form a condensation product with the alkanolamine. These compounds may be aliphatic or aromatic. In general, the carbonyl compounds may be represented by the formula 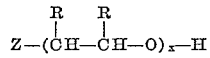 in which Z' represents a hydrocarbon radical having from 1–12 carbon atoms, and Z'' represents hydrogen or a hydrocarbon radical having 1–12 carbon atoms. Suitable ketones for the reaction include methylethyl ketone, methylisobutyl ketone, ethylisobutyl ketone, and diethyl ketone. Effective aldehydes include isobutyraldehyde, and 2-ethylhexaldehyde with β-substituted aldehydes being preferred. Aldehydes which self-condense to aldol compounds in the presence of a strongly alkaline catalyst are not as suitable as the above-mentioned materials.

Equimolar amounts of the reactants are generally employed in the formation of the condensation product although an excess of the carbonyl compound may be employed. This reaction is spontaneous in nature, particularly, when conducted at a moderately elevated temperature. The reaction may be conducted at a temperature in the range of 70° to 175° C. with the preferred temperature range being between 70° and 100° C. If desired, an inert solvent may be added to aid the reaction or to facilitate the removal of water liberated by the reaction. On completion of the formation of the condensation product, any excess carbonyl compound is removed by distillation preferably at reduced pressures followed by recovery of the condensation product.

The condensation product formed in the above step is reacted with an alkylene oxide under oxyalkylation conditions to form a condensation product-alkylene oxide adduct. The alkylene oxide adds on to the condensation product at the free hydroxyl group. A wide range of adduct compositions may be so prepared from lower molecular weight compositions having 1, 2, 5 or 10 mols of the alkylene oxide per mol of the condensation product to compositions in which 100 to 200 or more mols of the alkylene oxide have combined with one mol of the condensation product. Other important variations may be obtained by employing more than one alkylene oxide reactant in the adduct formation step or by alternately reacting different alkylene oxides.

The olefin oxide or 1,2-epoxy compound which may be employed in this process may be represented by the formula

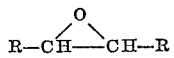

in which R represents hydrogen, or a hydrocarbon radical having from 1–12 carbon atoms. Suitable olefin oxides include ethylene oxide, propylene oxide, 1,2-butylene oxide, and 2,3-butylene oxide.

Oxalkylation of the Schiff base is desirably conducted at a moderately elevated temperature. Thus, the reaction may be conducted at a temperature in the range from about 40° to about 200° C., with the preferred operating temperature being from about 55° C. to about 100° C. Moderately elevated pressures are employed to improve the contact between the alkylene oxide and the condensation product. Such pressures may range from 0 to about 100 p.s.i.g. (pounds per square inch gauge).

The catalysts employed for the oxyalkylation reaction are critical for the formation of an adduct which hydrolyzes to the desired basic polyether composition having a primary amine group. The alkaline catalysts which are effective for this purpose are those which react with the condensation products to give anhydrous alkali alkoxides of the formula $R,R'C=NC_2H_4O^-M^+$ where M is a sodium or potassium ion. Suitable catalysts are sodium, sodium hydride, sodium amide, sodium hydroxide, sodium alkoxides, such as sodium methoxide and sodium ethoxide, and the corresponding potassium compounds. Water and alcohol formed respectively when a hydroxide or alkoxide catalyst is used must be removed before the condensation product and catalyst mixture is subjected to oxyalkylation.

The amount of catalyst which will effect the desired oxyalkylation reaction, may range from about 0.01 mole of catalyst per mole of condensation product up to the proportion of a mole of catalyst per mole of condensation product, the preferred range being from about 0.2 mole to 1 mole of catalyst per mole of condensation product. In certain of the reactions in which the condensation product is one formed in part from monoethanolamine, striking improvements in yields are obtained when the catalyst is employed in relatively high mole proportions, i.e. about 0.8 to 1 mole of catalyst per mole of the condensation product.

The condensation product-alkylene oxide adduct is hydrolyzed to form the basic polyether composition of this invention, the hydrolysis being effected by a reaction with water. This results in a splitting of the adduct at the point where the carbonyl and the amino groups originally combined without disturbing the alkylene oxide units added during oxyalkylation. Besides forming the basic polyether compositions, hydrolysis effects a regeneration of the carbonyl compound originally employed to form the condensation product. The hydrolyzed reaction product is stripped of the excess water and carbonyl compound to separate the basic polyether composition.

The hydrolysis reaction takes place spontaneously on contacting the adduct with water. However, heat may be employed. In addition, inorganic acids, such as hydrochloric and sulfuric acids, may be employed although these are not required.

The following examples illustrate the practice of this invention. In these examples, reference to the pressure in millimeters (mm.) means millimeters of mercury pressure absolute.

EXAMPLE I 400 grams of methyl isobutyl ketone and 315 grams of 2-(2-hydroxyethoxy)ethylamine were charged to a reaction vessel and heated to effect formation of a condensation product. Heating was continued resulting in the distillation of an azeotrope of the excess ketone and water overhead. A total of 46 grams of water were collected over a 2.5 hour period. Additional ketone was removed by distillation at 25 mm. pressure and 479 grams of the condensation product then obtained by distillation at 5 mm. of pressure. On redistillation, the condensation product had the following properties: boiling point 121° C. at 5 mm. pressure, $n(20/D)$ of 1.4601, density at 20°/4° C. of 0.9457, and $M_D$ 54.25 (calculated 54.55).

40 grams of the condensation product prepared above was charged to a reaction vessel with 0.2 gram of sodium hydride. Ethylene oxide was then charged to the sealed reaction vessel over a period of 5 hours while adduct formation was conducted at about 140° C. under 40 p.s.i.g. A total of 396 grams of ethylene oxide was thus reacted. The product of this reaction consisting of the condensation product-ethylene oxide adduct was a soft wax melting at 48–54° C., having a neutral equivalent value of 2,000.

401 grams of the adduct prepared above was charged to a reaction vessel with 250 milliliters of water. This mixture was heated to boiling to effect hydrolysis and the formation of a basic polyether composition. Regeneration of the ketone also took place. Methyl isobutyl ketone and water were removed by distillation at atmospheric pressure to a pot temperature of 200° C. and the residue was stripped to 185° C. at 1 mm. pressure. The hydrolyzed product weighing 385 g. was a light yellow solid melting at 44–54° C. It had a neutral equivalent of 2200 and conformed to the formula:

$$H_2N-(C_2H_4O)_n-H$$

in which $n$ has an average value of 50.

EXAMPLE II 129 grams of diethyl ketone and 105 grams of 2-(2-hydroxyethoxy)ethylamine were heated together to form a condensation product as in Example I above. This product had a boiling point of 113° C. at 5 millimeters pressure. This product exhibited the following properties: $n(20/D)$ 1.4625; D20/4, 0.9637; neutralization equivalent 173 (theory 173); $N_D$ 49.47; calculated, 49.83.

To 30 g. of the so-formed condensation product was added 0.2 g. of sodium. The mixture was heated in a reaction vessel and then reacted with 95 ml. of propylene oxide over a period of 2.5 hours at a temperature ranging from 140°–150° C. The resulting condensation product-propylene oxide adduct was stripped to a pot temperature of 205° C. at 22 mm. pressure. The product had a neutral equivalent of 533 and showed a strong $C=N$ infrared absorption at $6.0\mu$.

71 g. of the foregoing product was heated with 200 ml. of water to effect hydrolysis. The regenerated ketone was removed by steaming and the product, aminopolypropylene glycol, was dried by stripping to a pot temperature of 250° C. at 25 mm. pressure. The product was a water soluble liquid having a neutral equivalent of 460 and conformed to the formula:

$$H_2N-(C_2H_4O)_2-(C_3H_6O)_n-H$$

in which $n$ had an average value of 6.1.

EXAMPLE III 129 grams of diethyl ketone and 105 grams of 2-(2-hydroxyethoxy)ethylamine were heated together to condense these material and form a condensation product as in Example II above.

45 grams of the so-formed product was charged to a reaction vessel with 0.3 g. of sodium hydride. This mixture was reacted with 500 ml. of propylene oxide while a pressure of 80 p.s.i.g. and a temperature of 170° C. were maintained. The stripped adduct weighed 405, had a neutral equivalent value of 2920 and exhibited a weak $C=N$ absorption under infrared at $6.02\mu$.

A portion of the foregoing condensation product-propylene oxide adduct was hydrolyzed by heating in the presence of 200 ml. of water and then stripped to 200° C. at 2 mm. The basic polyether product was then washed with water, dissolved in benzene, rewashed with water and stripped to 200° C. at 1 mm. pressure. The final basic polyether product weighed 160 g. and had a neutral equivalent value of 4170. This product conformed to the formula:

$$H_2N-(C_2H_4O)_2-(C_3H_6O)_n-H$$

in which $n$ had an average value of 70.

EXAMPLE IV 159 grams of the condensation product-polypropylene oxide adduct having a neutral equivalent of 2920 prepared in Example III above, was reacted with 296 grams of ethylene oxide over a three hour period in the manner described above. 447 grams of the mixed propylene oxide-ethylene oxide adduct was recovered. This product was water-soluble. On testing, it had a neutral equivalent value of 8000 and a C=N infrared absorption at 6.0μ.

700 ml. of water was added to 396 g. of the above product and the mixture heated to boiling. Water was distilled to a pot temperature of 160° C. and the residue stripped to a temperature of 200° C. at 2 mm. pressure. The product weighing 391 g. was completely water soluble. Other properties were a melting point of 47.5–54° C., a neutral equivalent value of 8400, and a primary amine analysis of 0.11 meq./g. (theory 0.12 meq./g.). The product conformed to the formula:

$$H_2N-(C_2H_4O)_2-(C_3H_6O)_n-(C_2H_4O)_{n'}-H$$

in which $n$ had an average value of 47 and $n'$ had an average value of 124.

EXAMPLE V

Methyl isobutyl ketone and 2-(2-hydroxyethoxy)-ethylamine were reacted to form a condensation product in the manner described in Example I above.

58 grams of the condensation product formed above was charged to a reaction vessel with 0.12 g. of sodium hydride. 170 ml. of ethylene oxide was added and the reaction for adduct formation conducted at 50 p.s.i.g. at a temperature of 140° C. over a period of 1.5 hours. The reaction product containing the condensation product-ethylene oxide adduct was stripped at 110° C. under 5 mm. pressure for 30 minutes. 183 g. of the adduct was recovered having a neutral equivalent value of 613; $n_D^{20}$ 1.4685 and an infrared absorption for (C=N) at 6.0μ.

135 g. of the above adduct and 200 ml. of water were heated to boiling and the mixture distilled to remove water and the ketone. The product was stripped of residual water at 150° C. under 5 mm. pressure to yield a light yellow viscous liquid having a neutral equivalent of 540. This product conformed to the formula:

$$H_2N-(C_2H_4O)_n-H$$

in which $n$ had an average value of 11.9.

EXAMPLE VI

To 111 g. of the condensation product formed from 2-(2-hydroxyethoxy)ethylamine and methyl isobutyl ketone described in Example I above was added 0.3 g. of sodium hydride. 29 g. of 2,3-butylene oxide was reacted with this condensation product at 173–182° C. over a period of 1.5 hours. The condensation product-butylene oxide adduct was then heated with 158 g. of water to effect hydrolysis. 204 g. of ketone and water were removed overhead. The residue was flash distilled at less than 1 mm. of pressure and two portions collected overhead. The second portion had a neutral equivalent of 202 and a primary amine analysis of 4.93 meq./g. (theory 4.95) indicating an average of 1.3 mols of butylene oxide in the composition.

EXAMPLE VII

Preparation of Condensation Products

A. To a 1-liter, 3-neck flask, equipped with a stirrer and thermometer, was added 183 grams of monoethanolamine (3.0 mols) and 344 grams of diethyl ketone (4.0 mols). A 2.5 x 25 cm. fractionating column filled with stainless steel protruded packing was attached to the flask and a water trap with reflux condenser and thermometer were attached to the top of the column. The flask was heated at such a rate as to maintain a temperature of about 95° C. at the top of the column. The theoretical amount of water (3.0 mols) was collected after refluxing for four hours. Less than 0.5 percent of the amine came over with the water.

The condensation product, a light brown liquid, was purified by distillation through 2.5 x 75 cm. of stainless steel protruded packing using a reflux ratio of 10 to 2. There was obtained 352 grams of product boiling at 71° C. under 30 mm. of pressure and having a neutralization equivalent 128.6 (theory 129). This was a yield of 91% based on the amine. The distillation flask showed almost no residue.

B. 262 grams of 2-(2-aminoethoxy) ethanol and 258 grams of diethyl ketone were reacted to form a condensation product in the manner described above. A yellow product was obtained having a boiling point of 114° C. at 5 mm. of pressure and a neutral equivalent of 170 (theory 173). A yield of 80% was obtained.

C. 1050 grams of 2-(2-aminoethoxy) ethanol and 1100 grams of methyl isobutyl ketone were reacted in the manner described above. A yellow product was obtained having a boiling point of 125° C. at 5 mm. A yield of 84% was obtained.

D. 210 grams of 2-(2-aminoethoxy) ethanol were reacted with 300 grams of di-isobutyl ketone. A yellow product in a 67% yield was obtained having a neutral equivalent of 229 (theory 229).

E. 105 grams of 2-(2-aminoethoxy) ethanol and 108 grams of cyclohexanone were reacted in the manner described above. A 60% yield of a light brown condensation product was obtained.

F. 200 grams of 2-(2-aminoethoxy) ethanol and 200 grams of benzylaldehyde and 40 g. of benzene were reacted in the manner described above. The brown product had a boiling point of 168° C. at 8 mm. of pressure and a neutral equivalent of 194 (theory 193). A 79% yield was realized.

G. 183 grams of monoethanolamine and 344 grams of diethyl ketone were reacted in the manner described in A above. A colorless product was obtained having a boiling point of 71° C. at 30 mm. and a neutral equivalent of 128.6 (theory 129). The yield amounted to 91%.

H. 305 grams of monoethanolamine and 550 grams of methyl isobutyl ketone were reacted in the manner described above. A 68% yield of a pale greenish-yellow product was obtained having a boiling point of 114° C. at 38.5 mm. of pressure.

I. 183 grams of monoethanolamine and 426 grams of diisobutyl ketone were reacted in the manner described above. A 61% yield of a pale greenish-yellow product was obtained having a boiling point of 138° C. at 30 mm.

J. 68 grams of monoethanolamine and 98 grams of cyclohexanone and 156 g. of benzene were reacted in the manner described above. A 78% yield of a colorless condensation product was obtained.

K. 125 grams of 1-amino-2-propanol and 200 grams of methyl isobutyl ketone were reacted in the manner described above. A 76% yield of a colorless product having a boiling point of 92° C. at 37 mm. was obtained.

EXAMPLE VIII

*Preparation of the Condensation Product-Alkylene Oxide Adduct and Hydrolysis To Form the Basic Polyether Compositions*

A. 37 grams (0.2 mol) of the condensation product prepared by reacting monoethanolamine and isobutyl ketone together, described in Example VII–H, and 4 grams of sodium metal were added to a shaker type autoclave. The autoclave was closed, evacuated, flushed twice with nitrogen and heated to 65° C. for 30 minutes in a vacuum. 186 grams of ethylene oxide was then added over a four hour period at 65° C. and 40 p.s.i.g.

150 grams of the condensation product-ethylene oxide adduct prepared above was added to 250 mm. of water. Hydrochloric acid was added to the homogeneous solution to give a pH of 11.0 and the solution heated to boiling. The ketone produced by hydrolysis was distilled with the water to a pot temperature of 160° C. and the remainder of the reaction product stripped under vacuum at 165° C. Sodium chloride, formed by neutralization of the sodium with hydrochloric acid, precipitated on removal of the water and was separated by filtration. 112 grams of a light yellow solid product was obtained. This product had a melting point of 39–42° C., a neutralization equivalent 1100, a primary amine analysis of 0.85 meq./g. and a hydroxyl number of 130. The yield amounted to 93%.

B. 28 grams of the cyclohexanone-MEA (monoethanolamine) condensation product, which was prepared under part J of Example VII above, were reacted with 174 grams of ethylene oxide in the presence of 2.0 grams of sodium hydride at a temperature of 85° C. The resulting adduct was hydrolyzed to give an 83% yield of a primary amine derivative of a polyether composition.

C. 26 grams of the diethyl ketone-MEA condensation product prepared as described in part G of Example VII was reacted with 3.0 grams of sodium hydride at 65° C. The primary amine derivative of the polyether composition following hydrolysis had a neutral equivalent of 1005 (theory 1010), and a hydroxyl number of 123. The yield of the primary amine basic polyether composition amounted to 82%.

D. 37 grams of the diisobutyl ketone-MEA condensation product prepared as described in part I of Example VII above was reacted with 186 grams of ethylene oxide in the presence of 4.0 grams of sodium at 65° C. to form the adduct. After hydrolysis, a 93% yield of the primary amine basic polyether composition was obtained having a neutral equivalent of 1100 (theory 1000) and a hydroxyl number of 130.

E. 29 grams of the methyl isobutyl ketone-MEA condensation product prepared as in part H of Example VII above was reacted with 95 grams of propylene oxide in the presence of 3 grams of sodium at 100° C. to form the adduct. The adduct was hydrolyzed and a 36% yield of a basic primary amine polyether composition obtained having a neutral equivalent of 535 (theory 535).

F. 38 grams of the methyl isobutyl ketone-DGA condensation product prepared according to part C of Example VII was reacted with 174 grams of ethylene oxide at 70° C. in the presence of 1.0 gram of sodium hydride. A 75% yield of a primary amine basic polyether composition was obtained following hydrolysis having a neutral equivalent of 990 (theory 1000).

G. 38 grams of the methyl isobutyl ketone-DGA condensation product prepared according to part C of Example VII was reacted with 177 grams of propylene oxide at 140° C. in the presence of 0.2 gram of sodium hydride. An 85.6% yield of a primary amine basic polyether composition was obtained following hydrolysis having a neutral equivalent of 1653.

H. 35 grams of the diethyl ketone-DGA condensation product prepared according to part B of Example VII was reacted with 173 grams of ethylene oxide at 70° C. in the presence of 1.0 gram of sodium hydride. A 91% yield of a primary amine basic polyether composition was obtained following hydrolysis of the adduct. The product had a neutral equivalent of 1060 (theory 1050).

Obviously, many modifications and variations of the invention, as hereinbefore set forth, may be made without departing from the spirit and scope thereof, and, therefore, only such limitations should be imposed as are indicated in the appended claims.

We claim:

1. A process for preparing a primary amine basic polyether which comprises reacting a primary alkanolamine with an equivalent amount of a carbonyl compound at a temperature within the range of 70° to 175° C. to form a condensation product, reacting said condensation product with from about 0.01 to 1 mol per mol of condensation product of a material selected from the group consisting of the metals, hydrides, amides, hydroxides and alkoxides of sodium and potassium and removing any by-product water and alcohol of the reaction to thereby provide a reaction mixture containing an anhydrous alkali alkoxide, adding from about 2 to about 200 mols of an alkylene oxide per mol of condensation product to said reaction mixture at a temperature of 40° to 200° C. and a pressure of 0 to 200 p.s.i.g. to form an alkylene oxide adduct of said condensation product and hydrolyzing said adduct to form a primary amine basic polyether composition, said alkanolamine having the formula:

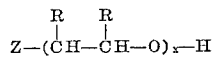

wherein:

Z is selected from the group consisting of —NH$_2$ and —R′—NH$_2$, R′ is selected from the group consisting of methylene and dimethylene, R is selected from the group consisting of hydrogen and C$_1$ to C$_2$ alkyl and $x$ is an integer having a value from 1 to 2, said carbonyl compound having the formula:

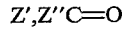

wherein:

Z′ represents a C$_1$ to C$_{12}$ hydrocarbon group and Z″ is selected from the group consisting of hydrogen and C$_1$ to C$_{12}$ hydrocarbon groups, said alkylene oxide being selected from the group consisting of ethylene oxide, propylene oxide, 1,2-butylene oxide and 2,3-butylene oxide.

2. A method as in claim 1 wherein the alkanolamine is monoethanolamine and the alkylene oxide is ethylene oxide.

3. A method as in claim 1 wherein the alkanolamine is 2-(2-aminoethoxy)ethanol and wherein the alkylene oxide is ethylene oxide.

4. A process for preparing a primary amine basic polyether which comprises reacting a primary alkanolamine with an equivalent amount of a carbonyl compound at a temperature within the range of 70° to 175° C. to form a condensation product, reacting said condensation product with from about 0.01 to 1 mol per mol of condensation product of a material selected from the group consisting of the metals, hydrides, amides, hydroxides and alkoxides of sodium and potassium and removing any by-product water and alcohol of the reaction to thereby provide a reaction mixture containing an anhydrous alkali alkoxide, adding at least 1 but less than 200 mols of a first alkylene oxide per mol of condensation product to said reaction mixture to form a first alkylene oxide adduct, reacting said alkylene oxide first adduct with at least a second alkylene oxide different from said first alkylene oxide to form a product adduct and hydrolyzing said product adduct to form said primary amine basic composition, said alkylene oxides being selected from the group consisting of ethylene oxide, propylene oxide, 1,2-butylene oxide and 2,3-butylene oxide, said alkylene oxides being reacted under reaction conditions, including a temperature within the range of 40° to 200° C. and a pressure within the range of about 0 to about 100 p.s.i.g., a total of from 2 to 200 mols of said alkylene oxides being reacted with said reaction product, said alkanolamine having the formula:

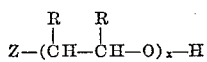

wherein:
Z is selected from the group consisting of —$NH_2$ and —$R'NH_2$, $R'$ is selected from the group consisting of methylene and dimethylene, R is selected from the group consisting of hydrogen and $C_1$ to $C_2$ alkyl and $x$ is an integer having a value from 1 to 2, said carbonyl compound having the formula:

wherein:
Z' represents a $C_1$ to $C_{12}$ hydrocarbon group and Z" is selected from the group consisting of hydrogen and $C_1$ to $C_{12}$ hydrocarbon groups.

5. A method as in claim 4 wherein said first alkylene oxide adduct is reacted with said second alkylene oxide to form a second adduct and wherein said second adduct is further reacted with an alkylene oxide different from said second alkylene oxide to form said product adduct.

6. A method as in claim 4 wherein the carbonyl compound is selected from the group consisting of methyl ethyl ketone, methyl isobutyl ketone, di-isobutyl ketone, ethyl isobutyl ketone, diethyl ketone, isobutyraldehyde, cyclohexanone, benzaldehyde and 2-ethyl hexaldehyde.

7. A process for preparing a primary amine basic polyether which comprises reacting a primary alkanolamine with an equivalent amount of a carbonyl compound at a temperature within the range of 70° to 175° C. to form a condensation product, reacting said condensation product with from about 0.01 to 1 mol of sodium hydride per mol of condensation product to thereby provide a reaction mixture containing an anhydrous alkali alkoxide, adding from about 2 to about 200 mols of an alkylene oxide per mol of condensation product to said reaction mixture at a temperature of 40° to 200° C. and a pressure of 0 to 200 p.s.i.g. to form an alkylene oxide adduct of said condensation product and hydrolyzing said adduct to form a primary amine basic polyether composition, said alkanolamine being selected from the group consisting of monoethanolamine, 1-amino-2-propanol, 2-amino-1-propanol, 3-amino-1-propanol, 2-(2-aminoethoxy)ethanol, 1-amino-2-butanol and 2-amino-3-butanol, said carbonyl compound being selected from the group consisting of methyl ethyl ketone, methyl isobutyl ketone, ethyl isobutyl ketone, diethyl ketone, isobutyraldehyde and 2-ethyl hexaldehyde, said alkylene oxide being selected from the group consisting of ethylene oxide, propylene oxide, 1,2-butylene oxide and 2,3-butylene oxide.

8. A method as in claim 7 wherein the alkanolamine is 2-(2-hydroxyethoxy)ethylamine, wherein the carbonyl compound is methyl isobutyl ketone and wherein the alkylene oxide is ethylene oxide.

References Cited in the file of this patent
UNITED STATES PATENTS
2,629,740    Carnes _____ Feb. 24, 1953